United States Patent [19]

Heiniger et al.

[11] Patent Number: 5,348,226
[45] Date of Patent: Sep. 20, 1994

[54] SPRAY BOOM SYSTEM WITH AUTOMATIC BOOM END HEIGHT CONTROL

[75] Inventors: Richard W. Heiniger; Troy C. Kolb, both of Hiawatha; Kent D. Funk, Manhattan, all of Kans.

[73] Assignee: RHS Fertilizing/Spraying Systems, Hiawatha, Kans.

[21] Appl. No.: 125,708

[22] Filed: Sep. 23, 1993

Related U.S. Application Data

[63] Continuation-in-part of Ser. No. 791,012, Nov. 12, 1992, abandoned.

[51] Int. Cl.⁵ .................. B05B 15/08; B05B 15/10
[52] U.S. Cl. ............................... 239/1; 239/73; 239/161; 239/168; 239/164
[58] Field of Search ........... 239/160, 161, 164, 166, 239/167, 168, 169, 1, 73; 364/424.07

[56] References Cited

U.S. PATENT DOCUMENTS

| | | |
|---|---|---|
| 4,023,020 | 5/1977 | Lestradet . |
| 4,078,365 | 3/1978 | Ingalls . |
| 4,202,498 | 5/1980 | Lestradet . |
| 4,414,792 | 11/1983 | Bettencourt et al. . |
| 4,427,154 | 1/1984 | Mercil ........................ 239/161 |
| 4,507,910 | 4/1985 | Thornley et al. . |
| 4,573,124 | 2/1986 | Sieferling ................. 364/424.07 |
| 4,733,355 | 3/1988 | Davidson et al. ......... 364/424.07 |
| 4,768,713 | 9/1988 | Roper . |
| 4,803,626 | 3/1989 | Bachman et al. . |
| 4,823,268 | 4/1989 | Giles et al. . |
| 4,835,691 | 5/1989 | Rotem et al. . |
| 4,933,853 | 6/1990 | Musil et al. ............. 364/424.07 |

FOREIGN PATENT DOCUMENTS

| | | | |
|---|---|---|---|
| 3639130 | 5/1988 | Fed. Rep. of Germany | 239/167 |
| 1153865 | 5/1985 | U.S.S.R. | 239/167 |
| 2156193 | 10/1985 | United Kingdom | 239/167 |

*Primary Examiner*—Andres Kashnikow
*Assistant Examiner*—William Grant
*Attorney, Agent, or Firm*—Litman, McMahon & Brown

[57] ABSTRACT

A spray boom system for mounting on a vehicle with opposite sides includes a pair of boom assemblies with proximate and distal ends. The boom assemblies are mounted on the vehicle and are swingable between laterally-extending field positions and folded travel positions generally alongside the vehicle. Hinged connector assemblies are attached to the boom assembly proximate ends for permitting the swinging movement of the boom arms and also permit the boom arms to be independently raised and lowered by a pair of hydraulic cylinders which are also connected to the boom assembly proximate ends. The operation of the cylinders for raising and lowering the boom assemblies is controlled by a height control system which utilizes ultrasonic signals for determining heights of the boom assemblies above a field or crop surface. A liquid dispensing system includes a tank for mounting on the bed of the vehicle, a pump, spray nozzles mounted on the boom assemblies and tubing interconnecting the liquid dispensing system components.

14 Claims, 5 Drawing Sheets

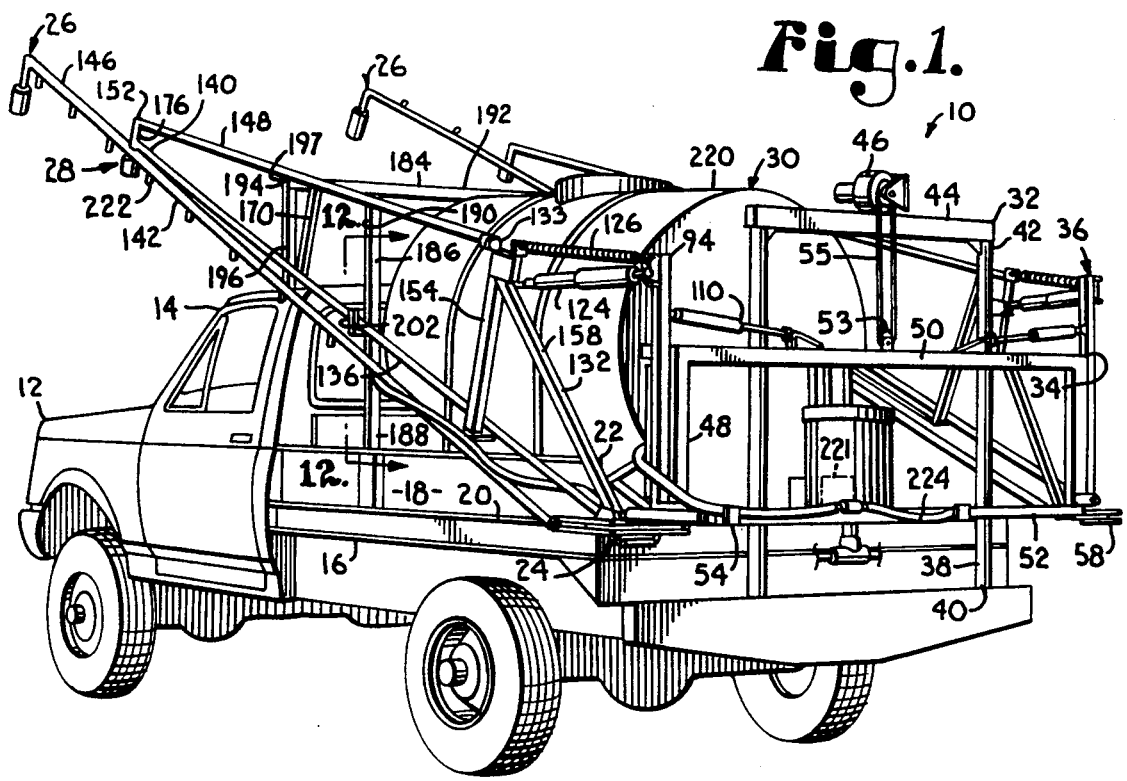
Fig.1.
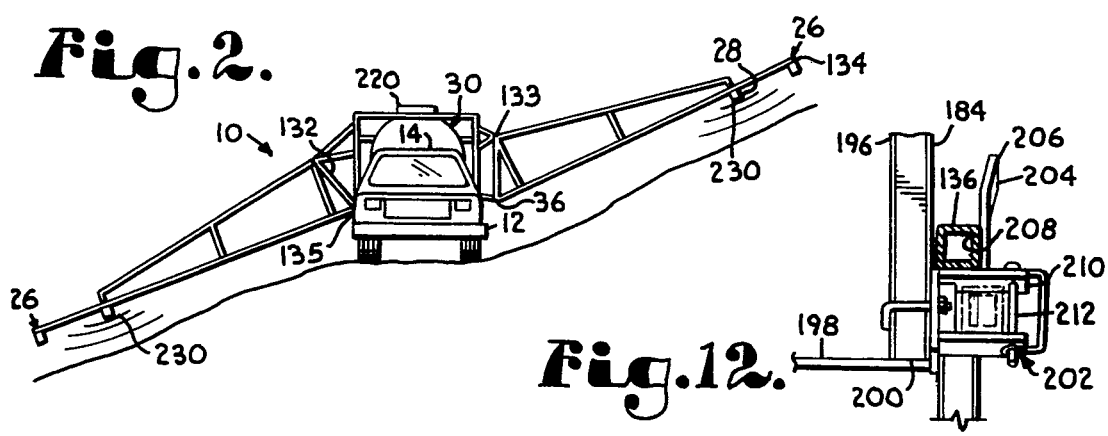
Fig.2.
Fig.12.
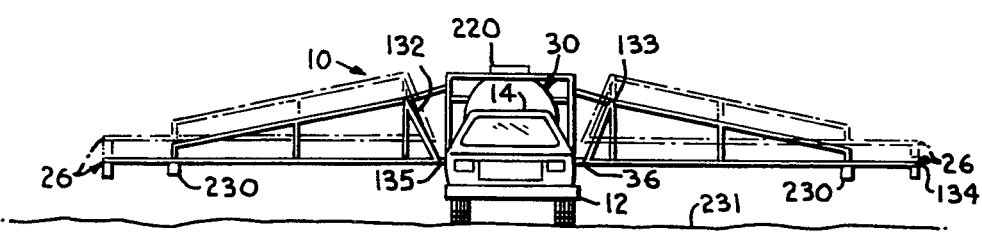
Fig.3.

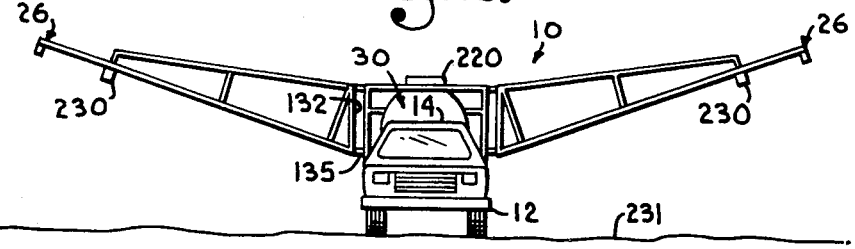
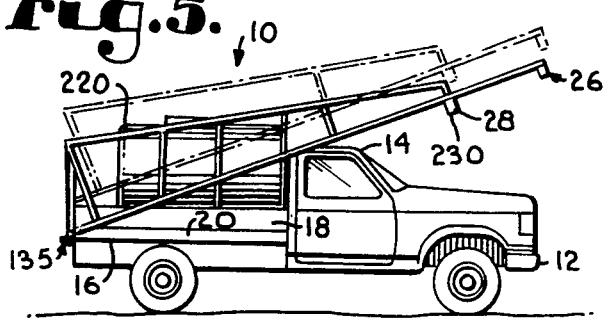
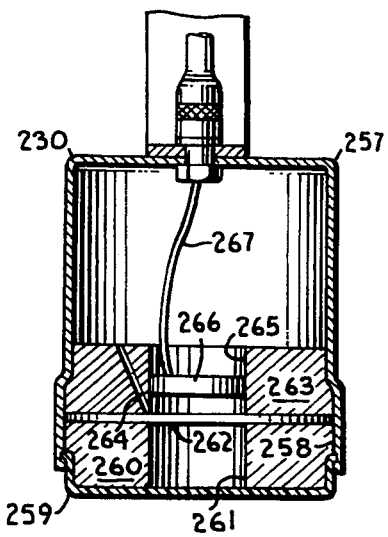
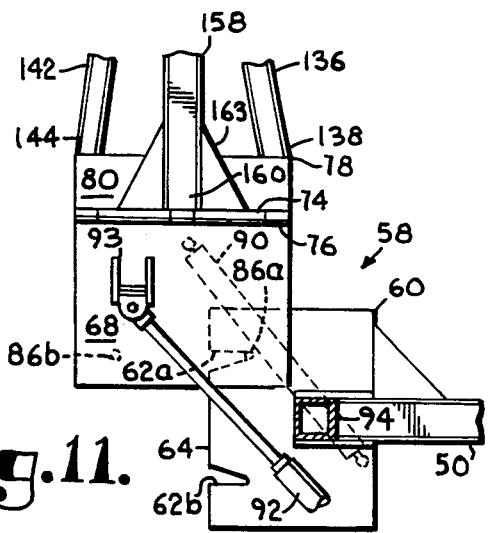
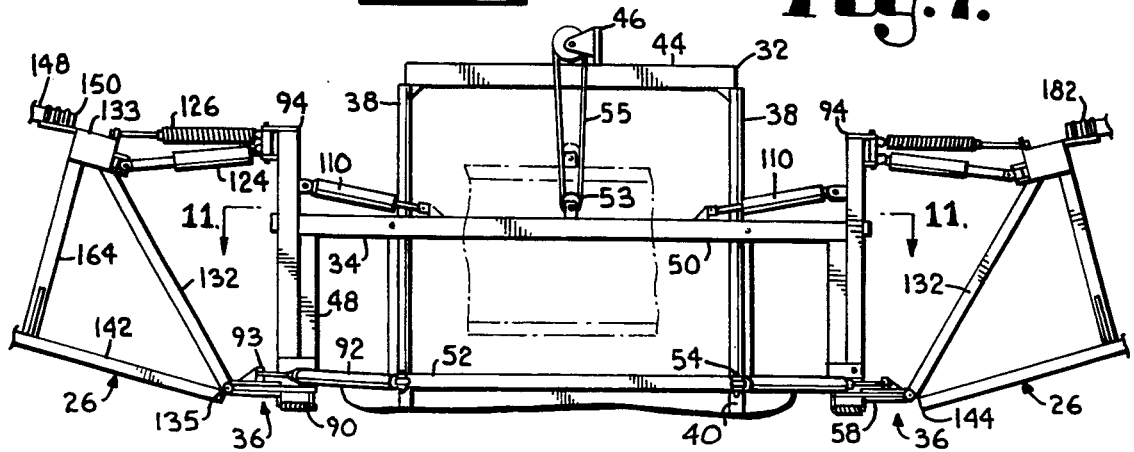

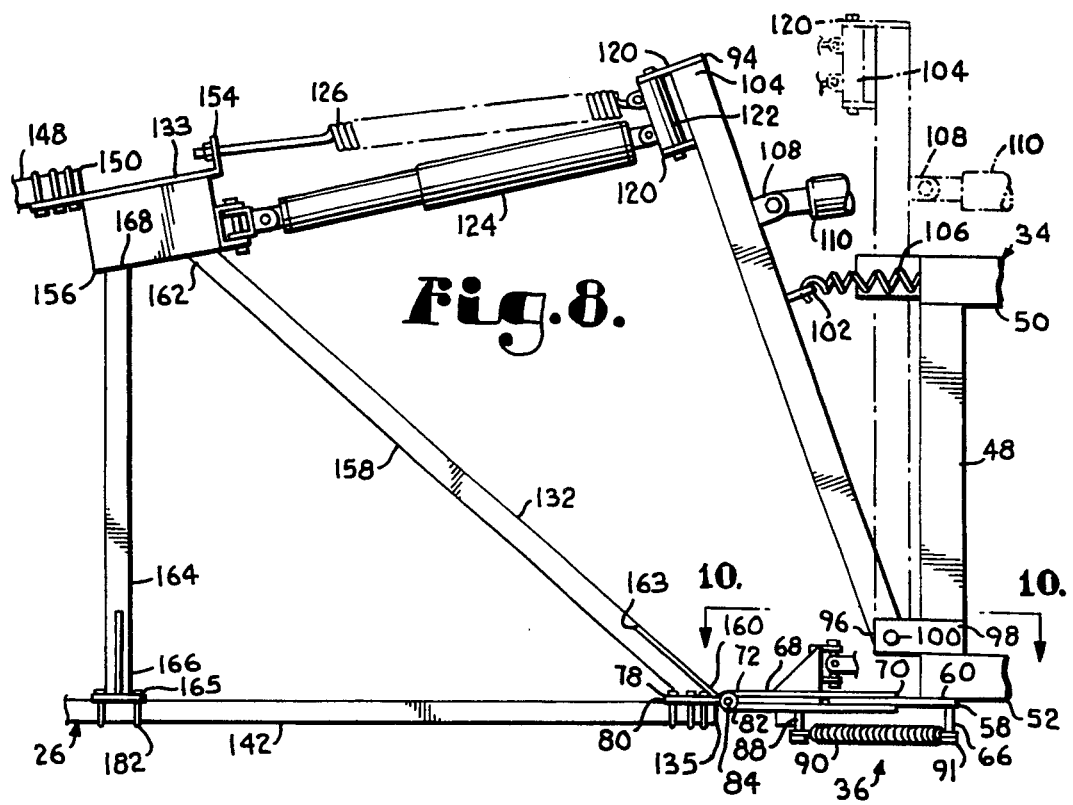
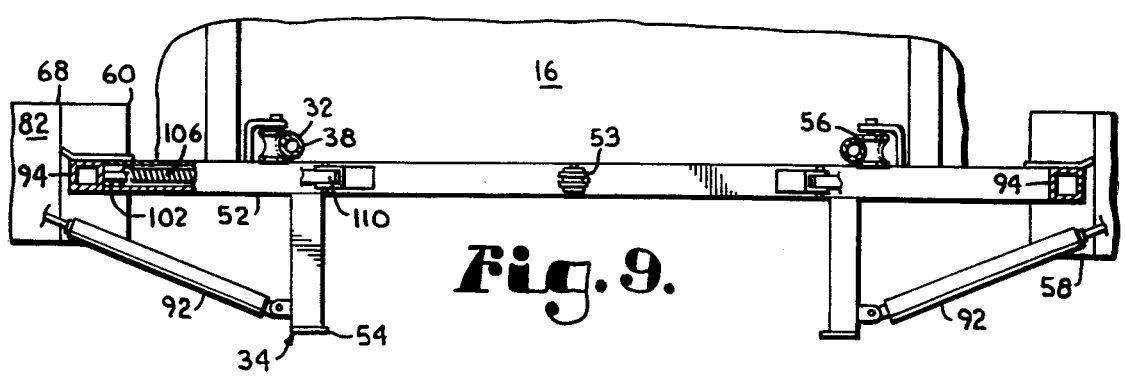
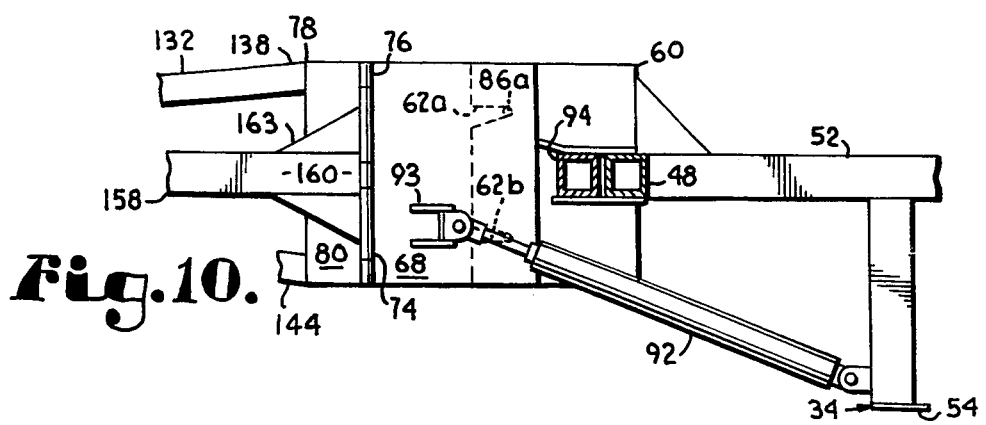

SPRAY BOOM SYSTEM WITH AUTOMATIC BOOM END HEIGHT CONTROL

This application is a continuation-in-part of application Ser. No. 07/791,012 filed Nov. 12, 1992, now abandoned.

BACKGROUND OF THE INVENTION

1. Field of the Invention.

The present invention relates generally to spraying equipment and in particular to a boom or wing height control system for an agricultural sprayer.

2. Description of the Relevant Art.

Agricultural fields are often sprayed with various chemical solutions, including fertilizers, herbicides, insecticides, etc. Various types of equipment are available for applying such chemical solutions. For example, aircraft are often used for field spraying and can cover relatively large areas at high speeds. However, more precise spraying can often be achieved with ground equipment, including pickup trucks fitted with spray equipment and systems. For example, a typical spray system might include: a tank mounted in a pickup truck bed; chemical mixing equipment; a pump; and a pair of booms or wings extending laterally from the vehicle and mounting the spray nozzles and associated tubing.

Spray systems have been devised with spray booms which extend laterally twenty feet or more from the vehicle sides. Operational efficiency advantages can be achieved with equipment capable of covering relatively wide swaths because the number of passes required to cover a given area can be minimized by maximizing the overall span of the spray booms. However, such wide-swath spray equipment may be too wide to transport over roads, and can also be too wide to conveniently store in existing structures with the booms extended. These problems have been addressed by providing mechanisms for folding the booms between their extended field positions and their folded transport positions. Transport positions for folding booms are often alongside the vehicles whereby the booms may swing through arcs of approximately ninety degrees between their field and transport positions.

Another problem with boom spraying equipment relates to difficulties in conforming the spray booms in their field positions to the terrain. These problems are exacerbated by sloping and uneven field conditions, and are further exacerbated by relatively wide-span spray booms which can create relatively large moment arms at the vehicles. For spray chemical coverage, the spray nozzles mounted on the booms should preferably be positioned at uniform heights above the field or crop surface. However, when traversing a sloping field, the boom on one side of the vehicle may need to be raised while the other boom may need to be lowered to maintain a relatively uniform spraying height for effective coverage. This problem has been addressed by providing boom elevation controls, which can be operated for each boom independently from the vehicle cab. However, manually controlled boom elevation systems are susceptible to human error factors in operation. For example, operators may have difficulty adjusting the elevations of a pair of spray booms in response to changing field contours while keeping the vehicle on a straight course.

Automatic height control devices have heretofore been utilized on agricultural equipment. For example, the Bettoncourt et al. U.S. Pat. No. 4,414,792 discloses a tomato harvester with a height control system utilizing ultrasonic signals for automatically determining an operating height of the machine. A hydraulic system is disclosed for adjusting the operating height in response to a control system which receives and processes the ultrasonic signals in the Bettoncourt et al. machine. The Thornelly et al. U.S. Pat. No. 4,507,910 discloses an automatic sonar activated height control for a combine header. The Siferling U.S. Pat. No. 4,573,124 discloses another height control for a tomato harvester which utilizes ultrasonic signals for determining operating heights.

Heretofore there has not been available a spraying system with an automatic height control with the advantages and features of the present invention.

SUMMARY OF THE INVENTION

In the practice of the present invention, a boom sprayer system is provided for mounted on a vehicle with opposite sides and a direction of travel. The spray boom system includes a guide frame for mounting on a bed of the vehicle, a main carrier frame vertically movably mounted on the guide frame, and a pair of boom assemblies connected to opposite sides of the main carrier frame by hinge assemblies. The hinge assemblies are adapted to permit swinging movement of the boom assemblies between respective field and travel positions thereof. A pair of jack units interconnect the main carrier frame and the boom assemblies and are adapted to raise and lower the boom assemblies. A boom height control system includes a pair of transducers mounted on the boom assemblies above crops and ground surfaces. The boom height control system controls the jack units to automatically raise and lower the boom assemblies in response to variations in crop and ground configurations whereby the boom assemblies can be maintained at relatively constant heights. A liquid dispensing system includes a tank mounted on the vehicle bed, a pump, spray nozzles mounted on the boom assemblies and tubing for interconnecting the liquid dispensing system components.

OBJECTS AND ADVANTAGES OF THE INVENTION

The objects and advantages of the present invention include: providing a boom spray system; providing such a system with an automatic height control system; providing such a system which utilizes ultrasonic signals for height sensing; providing such a system which can automatically and independently control and adjust the working heights of a pair of boom assemblies; providing such a system which is adapted for use with relatively wide-span boom assemblies; providing such a system which provides relatively uniform coverage of sprayed liquids; providing such a system which utilizes extensible and retractable jack units for raising and lowering the boom assemblies; providing such a system which gradually accelerates the jack unit electric motors when raising and lowering the boom assemblies; providing such a system which utilizes fiber reinforced plastic tubing for its boom assemblies; providing such a system which is economical to manufacture, efficient in operation, capable of a long operating life, and particularly well-adapted for the proposed usage thereof. Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a left side rear perspective view of a spray boom system embodying the present invention, shown mounted on a truck.

FIG. 2 is a front elevational view of the spray system showing a first boom in a raised position and a second boom in a lowered position to conform to sloping field conditions.

FIG. 3 is a front elevational view of the spray boom system showing the boom assemblies lowered, level positions in solid lines and in lifted positions in phantom lines.

FIG. 4 is a front elevational view of the spray boom system showing the boom assemblies in their lifted and raised positions.

FIG. 5 is a side elevational view of the spray boom system showing a boom assembly in its folded, travel position.

FIG. 6 is an enlarged, cross-sectional view of a transducer of an automatic height control system of the spray boom system.

FIG. 7 is an enlarged, fragmentary, rear elevational view of the spray boom system particularly showing a main carrier frame in a lowered position in solid lines and a lifted position in phantom lines.

FIG. 8 is an enlarged, fragmentary, rear elevational view of the spray boom system with a lift arm thereof shown in a lowered position in solid lines and in a raised position in phantom lines.

FIG. 9 is a fragmentary, enlarged, top plan view of the spray boom system.

FIG. 10 is an enlarged, fragmentary, top plan view of the spray boom system taken generally along line 10—10 in FIG. 8, with the associated boom assembly in an extended, field position thereof.

FIG. 11 is an enlarged, fragmentary, top plan view of the spray boom system, with an associated boom assembly shown in a folded, travel position thereof.

FIG. 12 is an enlarged, fragmentary, vertical, cross-sectional view of the spray boom system taken generally along line 12—12 in FIG. 1 and particularly showing a boom assembly retaining bracket.

DETAILED DESCRIPTION OF THE INVENTION

I. Introduction and Environment

Figure 13:
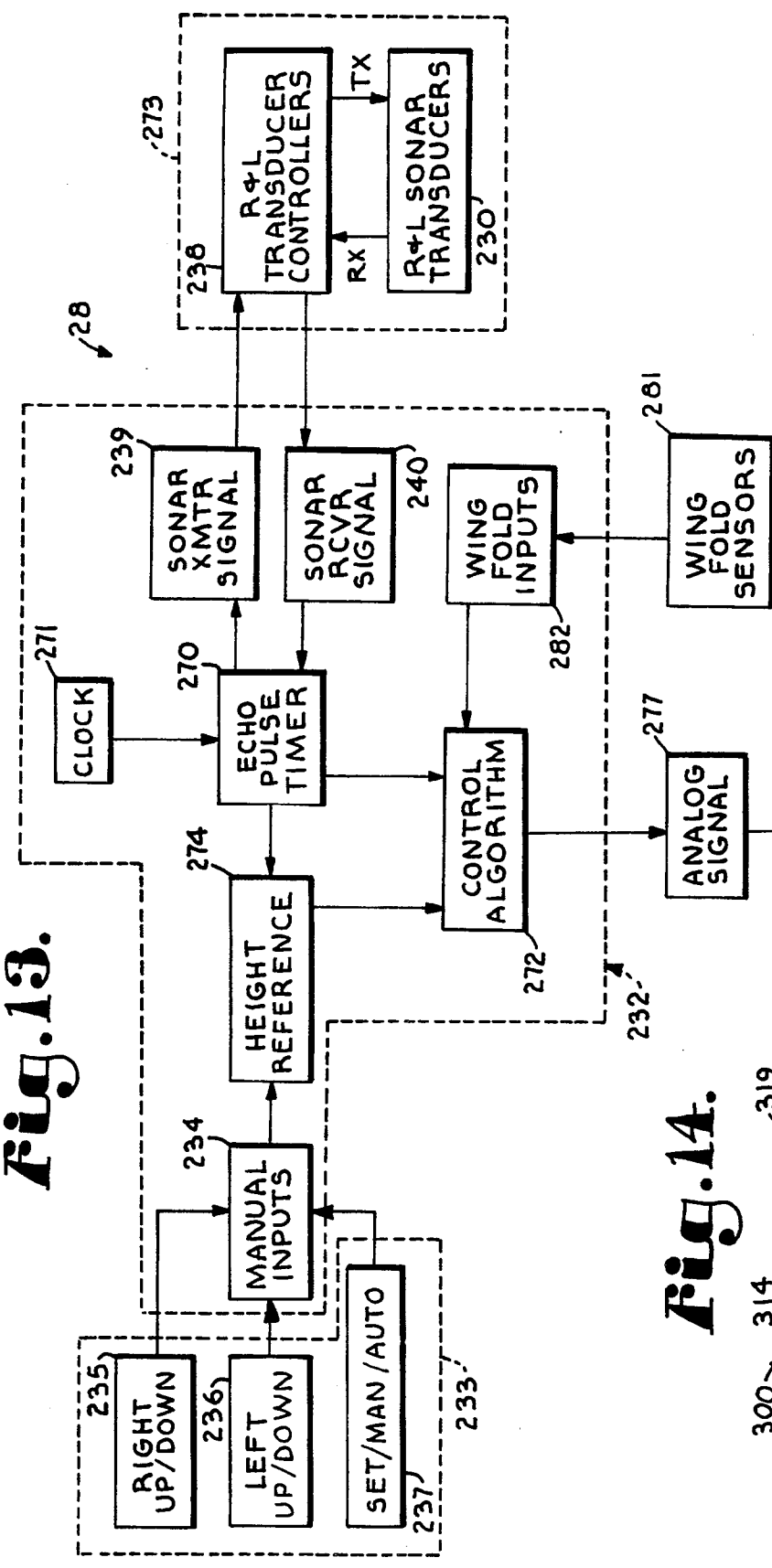
FIG. 13 is a functional block diagram of an automatic height control system for the boom assemblies of the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 10 generally designates a boom spray system embodying the present invention. Without limitation of the generality of useful applications of the boom spray system 10, it is shown mounted on a pickup truck 12 including a cab 14 and a rear bed 16. The pickup truck bed 16 includes a pair of sidewalls 18, a floor 20 and a tailgate opening (without a tailgate) 22. However, the boom spray system 10 of the present invention can be mounted on a variety of other vehicles, including trailers, tractors, high-clearance vehicles, etc. The boom spray system 10 generally comprises a boom mounting system 24, a pair of boom assemblies 26, a boom height control system 28, and a liquid delivery system 30.

II. Boom Mounting System 24

The boom mounting system 24 generally includes a guide frame 32, a main carrier frame 34, and a pair of hinged connecting assemblies 36. The guide frame 32 includes a pair of transversely-spaced, generally vertical, round tubular standards or pipe columns 38 with lower ends 40 secured to the vehicle chassis and upper ends 42 joined by a transversely-extending crossbeam 44. The crossbeam 44 mounts a winch or main carrier frame motor 46.

The main carrier frame 34 includes a pair of opposite side members 48 interconnected top-and-bottom by upper and lower cross members 50, 52 in a generally rectangular configuration. A pair of extension members 54 (FIG. 10) extend rearwardly from the lower cross member 52 in spaced relation inwardly from respective side members 48. Upper and lower pairs of guide rollers 56 (FIG. 9) are mounted on the upper and lower cross members 50, 52 respectively for rollingly engaging the standards 38 whereby the main carrier frame 34 is vertically movably mounted on the guide frame 32 for movement between a lowered position (solid lines in FIG. 7) and a raised position (phantom lines in FIG. 7). A pulley 53 is mounted on the upper cross member 50 and is connected to the winch 46 by a tensile member 55, which can comprise a cable, whereby the main carrier frame 34 can be raised and lowered on the guide frame 32 by the winch 46.

Each hinged connecting assembly 36 includes a lower hinge subassembly 58 with a generally horizontal proximate hinge plate 60 (FIG. 8) mounted on and projecting laterally from a respective lower corner of the main carrier frame 34. The proximate hinge plate 60 mounted on an projecting laterally from a respective lower corner of he main carrier frame 34. The proximate hinge plate 60 includes a pair of front and back notches 62a,b (FIG. 10) which open at an outer edge 64. A proximate, threaded, spring anchor stud 66 (FIG. 8) depends from the proximate hinge plate 60.

A pair of distal hinge plates 68 are located in generally parallel, horizontal planes and include inner and outer edges 70, 72. The distal hinge plates 68 are joined together at their outer edges 72 by a plurality of hinge tube segments 74 which are adapted for alignment with corresponding hinge tube segments 76 of an outer hinge half 78 including an outer hinge half plate 80. The distal hinge plates 68 and the hinge tube segments 74 form an inner hinge half 82 adapted for connection to the outer hinge half 78 by extending a horizontal hinge pivot pin 84 through their aligned hinge tube segments 74, 76. The lower hinge subassembly 58 is thus adapted for up and down (i.e. raise and lower) swinging movements about a generally horizontal pivotal axis extending through the hinge pin 84.

The distal hinge plates 68 are interconnected by a pair of generally vertical front and back hinge plate pins 86 a,b adapted to be selectively received in the proximate hinge plate notches 62. A distal, threaded, spring anchor stud 88 depends from the lower distal hinge plate 68 and is connected to the proximate, threaded, spring anchor stud 66 by a tension spring 90, which can be secured by nuts 91. The lower hinge subassembly 58 permits swinging, rotational movement between the plates 60, 68 about either of a pair of pivotal axes extending through the hinge plate pins 86.

Piston-and-cylinder units 92 extend from respective main carrier frame extension members 54 to respective mounting clevises 93 on the upper distal hinge plates 68 and are adapted for rotating the lower hinge assemblies 58 through arcs of movement of approximately 90 degrees, which correspond to swinging the boom assemblies 26 between laterally-extending field positions (FIG. 10) and forwardly-extending travel positions (FIG. 11).

In normal operation the front hinge plate pin 86a will remain fully inserted into the front hinge plate notch 62a, with the back hinge plate pin 86b swinging into and out of the back notch 62b as the boom assembly 26 swings between its field and transport positions. However, if the boom assembly 26 strikes and object in the field with the system 10 in forward motion, the lower hinge subassembly 58 can permit it to swing rearwardly to absorb the impact, in which case the back hinge plate pin 86b rotates within the back notch 62b, and the front hinge plate pin 86a swings outwardly and rearwardly from the front notch 62a. The lower hinge subassembly 58 thus provides a rocking type of connection for the boom assembly 26 on the main carrier frame 34.

A lift arm 94 (FIG. 8) includes a lower end 96 pivotally connected to a carrier frame side member 48 by a pair of clevis straps 98 extending outwardly from the side member 48 and receiving an axle bolt 100. A lower ear 102 projects inwardly from the lift arm 94 between its lower end 96 and an upper end 104 thereof. The lower ear 102 is connected to a boom lift spring 106 which extends into and is anchored internally within the carrier frame upper cross member 50.

An upper ear 108 also projects inwardly from the lift arm 94 and is positioned between the lower ear 102 and the lift arm upper end 104. A telescopically extendable and retractable hydraulic cylinder or boom motor means 110 (FIG. 7) is connected between each upper ear 108 and the main carrier frame upper cross member 50 and functions to pivot the associated boom assembly about the hinges 84 and 100 to raise and lower the outer ends of the boom assembly 26. Alternatively, jack screw units can be substituted for the cylinders 110.

A pair of clevis arms 120 extend outwardly from the lift arm 94 adjacent to its upper end 104 and pivotally mount a lift arm tubular swivel member 122 therebetween. A boom shock absorber 124 and an upper boom tension spring 126 are mounted on the swivel member 122.

III. Boom Assemblies 26

Each boom assembly 26 includes a proximate end 132 (FIG. 7) hingedly connected to the carrier frame 34 by a respective hinged boom connecting assembly 36 and a distal end 134 (FIG. 2). The proximate end 132 includes upper and lower corners 133, 135 (FIG. 1). Each boom assembly 26 also includes a front/inner lower chord 136 with proximate and distal ends 138, 140; a rear/outer lower chord 142 with proximate and distal ends 144, 146; and an upper chord 148 with proximate and distal ends 150, 152.

An inner boom support or shoulder subassembly 154 (FIG. 8) interconnects the chord proximate ends 138, 144, 150 and includes a shoulder connecting bracket 156 at the upper corner 133 clamped on the upper chord proximate end 150 and connected to the boom shock absorber 124 and the upper boom tension spring 126. The outer hinge half plate 80 is clamped to the lower chord proximate ends 138, 144. The shoulder subassembly 154 includes a diagonal brace member 158 with a lower end 160 connected to the outer hinge half plate 80 by a gusset 163 (FIG. 11) and an upper end 162 connected to the shoulder connecting bracket 156. The shoulder subassembly 154 also includes a proximate vertical brace 164 (FIG. 8) with a lower end 166 connected to the lower chords 136, 142 by a connecting clamp 165 at the lower corner 135 and an upper end 168 connected to the shoulder connecting bracket 156. The shoulder subassembly 154 thus generally forms a rigid structural triangle with the braces 158, 164 and proximal portions of the lower chords 136, 142.

The boom assembly 26 includes an intermediated brace 170 with a lower end 172 clamped to the lower chords 136, 142 and an upper end 174 clamped to the upper chord 148. An outer brace 176 includes a lower end 178 clamped to the lower chords 136, 142 and an upper end 180 clamped to the upper chord 148. The front/inner lower chord 136 and the upper chord 148 terminate at distal ends 140, 152 in proximity to the outer brace 176, and the rear/outer lower chord 142 extends therebeyond to its distal end 146.

The components of the boom assemblies 26 can be interconnected by various suitable means, such as U-bolt clamps 182 (FIG. 8). The components of the boom assemblies 26 can be made of various material with suitable strength characteristics. Since relatively wide spans may be desirable for the boom assemblies 26, relatively high-strength, low-weight material may be preferred. For example, fiber reinforced plastic (FRP) square tubing can be utilized. Suitable tubing is available from the Morrison Molded Fiber Glass Company under the trademark EXTREN and is manufactured by a pultrusion continuous molding or extrusion process.

A boom retainer rack 184 (FIGS. 1 and 12) is mounted on the truck bed 16 behind the cab 14 and includes a pair of standards 186 with lower ends 188 mounted on the bed 16 adjacent to respective opposite truck bed side walls 18. The rack standards 186 also include upper ends 190 and a crossbar 192 which is connected to the standard upper ends 190 and includes a pair of opposite ends 194 projecting outwardly from the standards 186. The boom retainer rack 184 further includes a pair of end pieces 196 each connected at an upper end 197 thereof to a respective crossbar end 194 and depending therefrom. A pair of straps 198 extend horizontally between and connect lower ends 200 of the end pieces 196 and the standards 186.

A boom retainer bracket 202 is mounted on each end piece 196, for example, adjacent to its lower end 200.

Each boom retainer bracket includes a retainer bar 204 with an outwardly-bent or flared end 206. Each retainer bar 204 forms a notch 208 with a respective end piece 196. The notches 208 are open upwardly at their respective flared ends 206 and are adapted to receive the inner, lower chords 136 of the boom assemblies 26. Each boom retainer bracket 202 also includes a clevis 210 which opens outwardly to receive a respective boom assembly inner, lower chord 136, which can be secured in place by a suitable, releasable retaining pin 212.

IV. Liquid Handling System 30

The liquid handling system 30 includes a tank 220 (FIG. 1) mounted in the truck bed 16, a suitable pump 221, a plurality of spray nozzles 222 positioned in spaced relation along the boom assemblies 26 and directed downwardly, and tubing 224 for fluidically interconnecting the liquid handling system components. The liquid handling system 30 can include various suitable liquid handling components, such as valves, pumps, flow meters, pressure gauges, etc. (not shown). The nozzles 222 are preferably spaced apart by appropriate distances, taking into consideration their spray patterns and the preferred spray heights, so that substantially complete spray coverage is achieved.

V. Boom Height Control System 28

The boom height control system is 28 adapted to automatically control the heights of the boom assemblies 26, to maintain a relatively constant height above a ground surface 231 or the top levels of a field of crops. A transducer unit 230 is mounted on each boom assembly 26 and utilizes ultrasonic or other types of signals to measure the height of the transducer units 230 above the ground surface 231, compare the measured height with a reference height, and control the actuators 110 in such a manner as to minimize a difference between the measured height and the reference height. The illustrated control system 28 utilizes ultrasonic height measurement and employs ultrasonic transducer units 230.

FIG. 13 illustrates the functional aspects of the boom height control system 28. The control system 28 employs a digital computer 232 which may be a microcontroller which is suitably programmed or a microprocessor with external chips implementing read-only memory, read/write memory, input and output ports, and the like (not shown). The computer 232 is conventional from a hardware standpoint, and the exact implementation of the computer 232 is not critical to the present invention. Many suitable implementations of the computer 232 would occur to one skilled in the art; therefore, further hardware details of the computer 232 are omitted herein for brevity.

The computer 232 has the right and left (R and L) ultrasonic transducer units 230 interfaced to output ports thereof and has manual controls 233 interfaced to a manual inputs function 234 of the computer 232. The manual controls 233 include right and left up/down controls 235 and 236, which allow manual operation of the boom actuator cylinders 110 to manually set the angles of the boom assemblies 26, and a mode switch or selector 237. The mode selector 237 enables the setting of a reference height of the transducers 230, a manual mode selection to allow manual control of the boom actuators 110 to set the boom assemblies 26 individually at desired angles or end heights using the controls 235 and 236, or an automatic mode which enables the computer 232 to maintain the boom assemblies 26 at a selected end height.

Each transducer unit 230 has associated therewith a transducer controller 238 including conventional circuitry to generate an ultrasonic frequency pulse to drive the associated transducer unit 230 in response to a sonar transmitter signal command from a transmitter signal function 239 of the computer 232 and to acknowledge receipt of a sonar echo by the transducer unit 230 to a sonar receiver signal function 240 of the computer 232.

A construction of a transducer unit 230 which would be suitable for use with the boom height control system 28 is shown in FIG. 6. The transducer 230 includes a housing 257 with a downwardly open mouth 258 which can be closed with a cap 259. Suitable materials for the housing 257 and the cap 259 are aluminum and plastic respectively for protecting the transducer 230 from dust, precipitation, fertilizers, and the like. A lower ring of closed cell foam 260 is mounted in the housing mouth 258 and includes a center opening 261. A layer 262 of acoustical foam is placed on top of the lower closed cell foam ring 260. An inner closed cell foam ring 263 is mounted on top of the acoustical foam layer 262 and has an air vent 264 and a center opening 265 extending therethrough. A transducer element 266 is received in center opening 265 of the upper closed cell foam ring 2.53. A cable 267 extends from the transducer element 266 to the other components of the boom height control system 28 and carries the transmitted signals to the transducer element 266 as well as the echo signals from the transducer element 266.

The transmitter signal function 239 and receiver signal function 240 interface with an echo pulse timer function 270 which outputs a transmit command pulse to the transducer controller 238 and detects a receive pulse therefrom and measures an echo time between the transmit and receive pulses, relative to a system clock 271. The height of a transducer 230 above a sound reflecting medium, such as the ground surface 231 or plant tops, is proportional to the measured echo time and can be scaled thereto by a control algorithm 272 of the computer 232. Each transducer unit 230 and associated controller 238 comprises a transducer assembly 273 for a given boom assembly 26 and may be mounted together remote from the computer 232 as a self-contained sonar transducer package.

The control algorithm 272 functions to control the boom actuator cylinders 110 to maintain the transducers 230 at a selected height to thereby maintain the boom assemblies 26 generally at the selected height. The computer 232 determines the selected height by operation of a reference height function 274 of the computer 232. In the illustrated control system 28, the mode selector 237 is placed in the manual mode, and the right and left manual controls 235 and 236 are operated to manually place the boom assemblies 26 at desired angles by operation of the actuator cylinders 110. When the boom assemblies 26 are at angles which position the sprayers 222 at desired heights, the mode selector 237 is moved to the set position and from the set position to the automatic position through the manual position. Movement of the mode selector 237 from the set position to the manual position causes the height reference function 274 to average a selected number of echo time readings from the echo pulse timer 270 to determine a height reference.

The illustrated boom actuator cylinders 110 are double acting hydraulic cylinders and are controlled hydraulically by solenoid hydraulic valves 275. The computer 232 outputs a digital signal which is converted to an analog DC level in a digital to analog converter 277 to control the duty cycle of a pulse width modulator (PWM) 278. The output of take PWM 278 is applied through appropriate power drivers 279 to the solenoid hydraulic valves 275 to control the speed and direction of actuation of the cylinders 110.

The boom height control system 28 has wing fold sensors 281 which apply signals to the control algorithm 272 by way of a wing fold inputs function 282 to signal the folding of the boom assemblies 26 to the forwardly extending travel positions (FIG. 11). Detection of the travel positions of the boom assemblies 26 locks out the control algorithm 272 from attempting to operate in an automatic mode to maintain the boom assemblies at a reference height. However, the manual lift controls 235 and 236 can still be employed, under such lockout conditions, to facilitate placement of the boom assemblies 26 into the notch 208 or retainer bracket 202 for travel or removal of the boom assemblies 26 therefrom.

Figure 15:
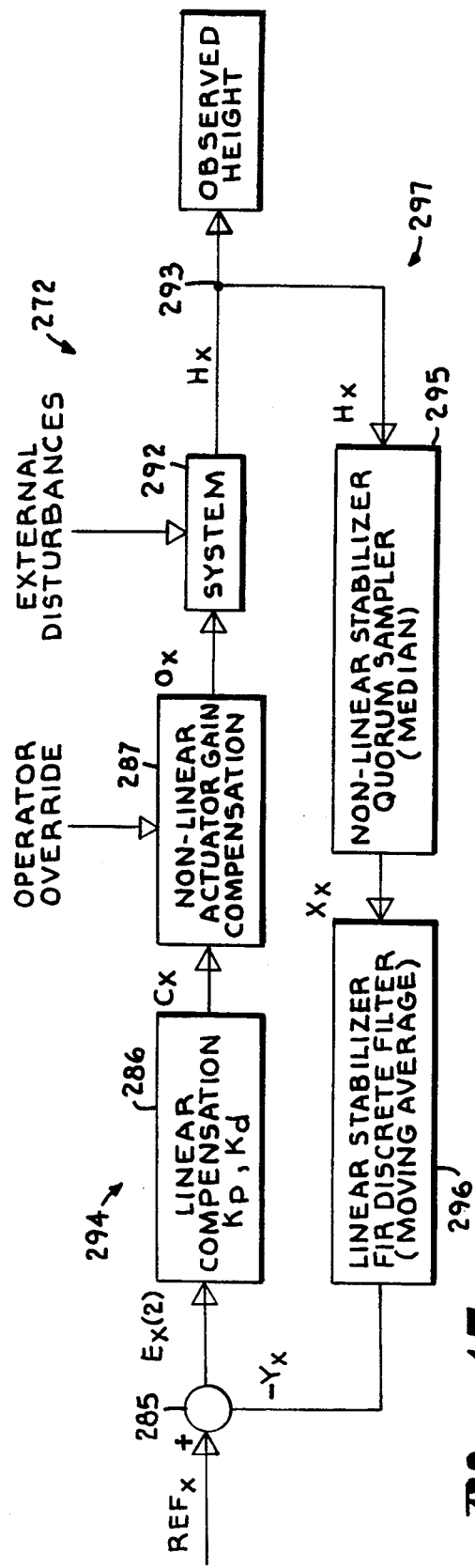
FIG. 15 is a block diagram illustrating the control algorithm of the height control system of the present invention.

The control algorithm 272 of the illustrated boom height control system 28 is a digital implementation of a closed loop feedback control system. FIG. 15 illustrates the principal components of the control algorithm 272. In the variables shown in FIG. 15, the lower case "x" represents either right or left variables associated respectively with the right or left boom assemblies 26 and components and parameters thereof. At a summation point 285, a height reference REFx, derived from the height reference function 274, is compared or differenced with an observation vector Yx from a feedback loop to derive an error vector Ex. The error vector Ex is compensated in such a manner as to minimize the difference between the reference REFx and the observation vector Yx to thereby reduce the error vector Ex to zero by a linear compensation operation 286 and a non-linear compensation operation 287. The linear compensation operation 286 includes a proportional gain factor Kp and a differential gain factor Kd which generate a control value Cx. The linear compensation 286 may alternatively incorporate an integral gain factor Ki (not shown).

Figure 16:
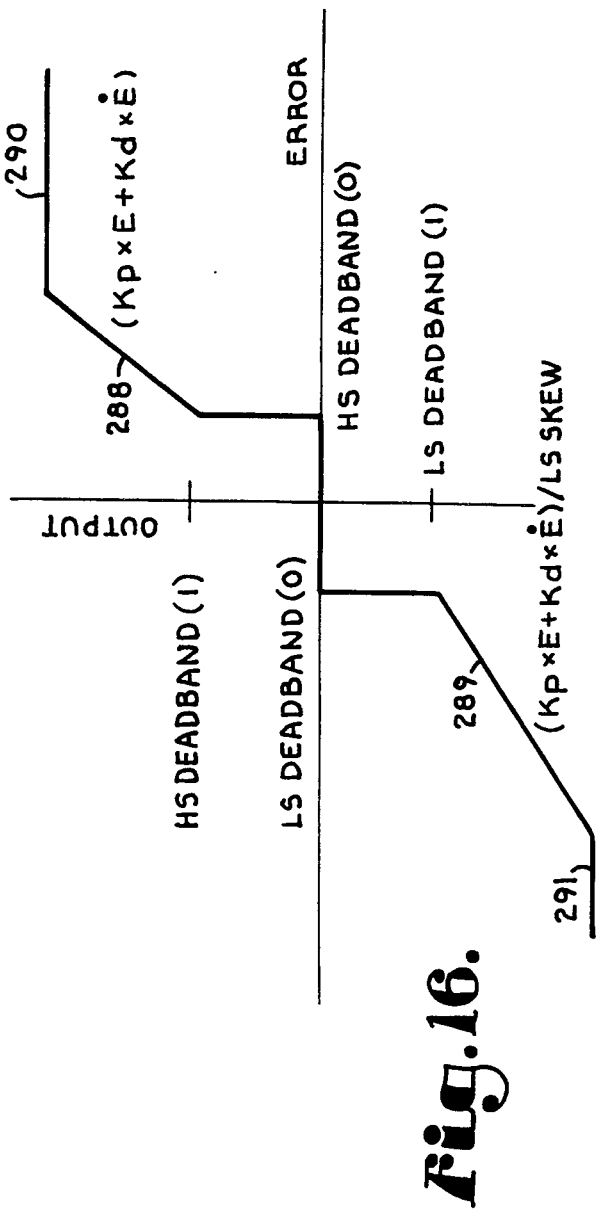
FIG. 16 is a graph illustrating a non-linear actuator gain characteristic of the control algorithm of the height control system.

FIG. 16 graphically illustrates the characteristics of the non-linear compensation operation 287 and plots an output value Ox for a given error vector Ex. As can be observed in FIG. 16, a first quadrant curve portion 288 has a different slope from a third quadrant curve portion 289. The reason for this is to compensate for the assistance of gravity in moving the boom assemblies 26 in the downward direction. The letters "HS" indicate "high side", or upward movements of the boom assemblies 26, while "LS" indicates "low side" or downward movements.

Between error values LSdeadband(0) and HSdeadband(0), the output value Ox is zero, thereby providing a deadband which prevents the control system 28 from responding to small variations in the measured boom height, which would otherwise introduce unnecessary corrections and instabilities into the control system 28. Between a high side breakpoint at (HSdeadband(0),HSdeadband(1)) and a high side saturation rail 290, the slope of the compensation curve is equal to $K_p*E+K_d*E$, wherein $K_p$ and $K_d$ represent proportional and differential gains respectively, E represents the error signal, and E represents the derivative of E. Similarly, between a low side breakpoint at (LSdeadband(0),LSdeadband(1)) and a low side saturation rail 291, the slope of the compensation curve is ($K_p*E+K_dE$)/Lsskew, wherein Lsskew represents a low side correction to the slope of the third quadrant curve 289. Operation of the manual controls 235 and 236, shown as "operator overrides" in FIG. 15, overrides the compensation operation 287 and moves the algorithm 272 directly to the saturation rails 290 or 291 respectively.

The system block 292 represents the boom actuators 110, the boom assemblies 26, and the entire spray boom system 10, including external disturbances. The external disturbances may include factors such as traveling over rough terrain and accelerations and decelerations of the truck 12 which may introduce oscillations in the boom assemblies 26. Such disturbances can be sensed at a sensing point 293 as errors in the positions of the transducers 230, but are difficult if not impossible to model accurately.

The linear compensation 286, non-linear compensation 287, and system block 292 constitute a forward loop 294 of the control algorithm 272. A non-linear stabilizer function 295 and a linear stabilizer function 296 constitute a feedback loop 297 of the control algorithm 272, and connect the sensing point 293 back to the summation point 285. The non-linear stabilizer 295 is in the form of a quorum or majority sampler which functions as a trend discriminator which ignores large "outlyers" or samples which deviate excessively from the average sample. The linear stabilizer 296 is in the form of an FIR (finite impulse response) filter and determines a moving average of a selected number of previous inputs. The linear stabilizer 296 functions essentially as a low pass filter. The non-linear stabilizer 295 derives a sensory vector Xx from the measured boom height Hx, and the linear stabilizer 296 derives the observation vector Yx from the sensory vector Xx. The gains in the forward loop 294 are selected to zero the error vector Ex as rapidly as possible, while the responses of the stabilizers 295 and 296 in the feedback loop 297 damp the correction process to minimize instabilities in the control algorithm 272 as a whole.

Many of the components of the boom height control system 28, including manual operator controls, can be mounted in the pickup truck cab 14 for convenient accessibility by the operator.

VI. Operation

In operation the spraying system 10 can be initialized for spraying at predetermined boom heights, whereby the automatic boom height control system 28 will maintain the boom assemblies 26 at substantially constant heights above the ground surface 231 or the tops of the crop plants. In their field positions (FIGS. 2 and 3), the boom assemblies 26 extend laterally from the truck 12 and are substantially perpendicular to its direction of travel. The fiberglass boom assemblies 26 have relatively high strength-to-weight ratios whereby relatively wide boom spans are feasible. The boom assemblies 26 can be configured in various ways to achieve desired spans. For example, additional sections can be attached to the ends of the boom assemblies 26 for extending them even further. Furthermore, multi-section boom assemblies can be provided with sections which are articulated with respect to each other and individually flexed for conforming to terrain and crop configurations.

The boom height control system 28 is adapted to independently operate the cylinders 110 for raising and lowering the boom assemblies 26. The boom assembly return or lift springs 106 function to counterbalance the weights of the boom assemblies 26, which are thereby maintained somewhat in equilibrium. Since the boom assemblies 26 are independently controlled, field conditions can be accommodated which require one boom assembly 26 to be raised and the other lowered (FIG. 2). Such conditions might be encountered, for example, on terraced fields. If an obstruction is encountered by one of the boom assemblies 26, the lower hinge assembly 58 (FIG. 7) is adapted to rock rearwardly whereby the front hinge plate pin 86a (FIG. 1) swings out of the front notch 62a. When the obstruction is cleared, the tension or return spring 90 (FIG. 8), together with the weight of the boom assembly 26, will tend to return the pins 86a,b into their respective notches 62a,b.

The boom retainer brackets 202 (FIG. 12) provide alternative means for retaining the boom assemblies 26 in their transport positions. The inner, lower chords 136 can be retainer either in the bracket notches 208 or in the bracket clevises 210. The bracket clevises 210 can provide more secure retention because the boom assemblies 26 can be captured therein by the retaining pins 212. However, for transporting the spraying system 10 over relatively short distances, the notches 208 can be utilized, and offer the advantage of permitting an operator to retain and release the boom assemblies 26 without leaving the truck cab 14.

The procedure for unfolding the boom assemblies 26 from the transport to their field positions involves raising the main carrier frame 34 (FIG. 1) with the winch 46 until the boom assembly inner, lower chords 136 are raised out of the retainer bracket notches 208 and clear the retainer bas ends 206. The cylinders 92 are then retracted for swinging the boom assemblies 26 outwardly and rearwardly to their field positions. As shown in FIGS. 4 and 5, the boom assemblies 26 are generally raised (i.e. the cylinders 110 are retracted) in their travel positions. The main carrier frame 34 is lowered with the winch 46 and the boom assemblies 26 can be lowered (i.e. by extending the jack units 110) to appropriate field positions, from which further height adjustments can be accomplished either manually or with the automatic height control system 28.

The procedure for placing the boom assemblies 26 in their travel positions involves raising the boom assemblies 26 with the cylinders 110, raising the main carrier frame 34 with the winch 46, swinging the boom assemblies 26 forwardly and inwardly with the cylinders 92, and securing the boom assemblies 26 forwardly and inwardly with the cylinders 92, and securing the boom assemblies 26 with the boom retainer brackets 202. The boom assembly inner, lower chords 136 can be placed in the notches 208 by swinging the boom assemblies 26 forwardly and inwardly until they engage the end pieces 196, and then lowering the main carrier frame 34 until the inner, lower chords 136 are received within the notches 208. Alternatively, the inner, lower chords can be positioned in the clevises 210 and secured therein by the retaining pins 212 for relatively secure attachment to the boom retainer rack 184.

VII. Modified or Alternative Sensor Embodiment

Figure 14:
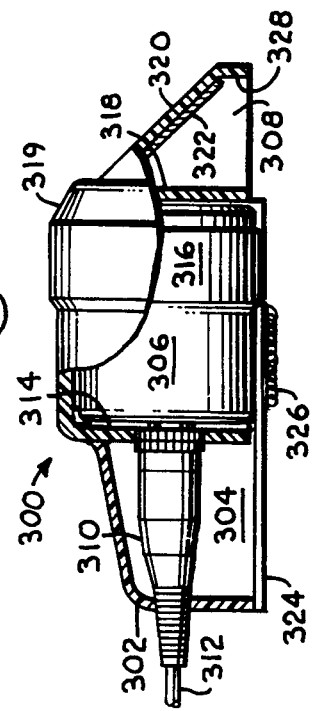
FIG. 14 is a side elevational view of a modified or alternative embodiment sensor assembly with portions broken away to reveal internal construction.

A modified or alternative sensor assembly 300 is shown in FIG. 14 and includes a housing 302. The housing 302 includes a proximate connector chamber 304, an intermediate transducer chamber 306 and a distal reflector chamber 308.

The connector chamber 304 receives an electrical connector 310 connected to a cable 312. The connector 310 is mounted on a first divider wall 314 between the connector chamber 304 and the transducer chamber 306. The cable 312 extends through the connector 310 and the first divider wall 314 and into the transducer chamber 306. The transducer chamber 306 mounts a transducer element or sensor 316, which can be similar to the transducer element 266 described above and can be encased in foam. A second divider wall 318 divides the transducer chamber 306 and the reflector chamber 308.

The reflector chamber 308 includes a reflector wall 320 of the housing 302 which slopes downwardly and outwardly from an upper edge 319 of the second divider wall 318. An acoustic reflector element 322 is mounted on the reflector wall 320 inside the reflector chamber 308.

The housing 302 includes a base 324 which encloses the connector and transducer chambers 304, 306. A hook-and-loop fastener material 326, such as that available under the trademark "Velcro", can be placed on the base 324 for mounting the sensor assembly 300 on one of the boom assemblies 26. The housing 302 includes a mouth 328 which opens downwardly from the distal reflector chamber 308. The mouth 328, the reflector element 322, and the transducer element 316 are cooperatively oriented whereby signals are deflected through an angle of approximately 90 degrees between the mouth 328 and the transducer element 316.

By reflecting signals into and out of the mouth 328 to and from the transducer element 316 which is positioned away from the mouth 328, greater protection for the transducer element 316 can be provided by the housing 302. Since the transducer element 316 is not directly aligned with the mouth 328, crop stalks, leaves, and other debris which might enter the housing 302 will generally tend to be confined to the reflector chamber 308. The transducer element 316 will thus tend to be protected from such debris and foreign objects. Although the housing assembly 300 is described and illustrated as having a reflector element 322 in addition to the reflector wall 320, depending upon the materials from which the reflector wall 320 is formed, the reflector wall 320 may adequately reflect the sound energy from the transducer element 316, whereby the reflector element 322 may not be necessary.

It is to be understood that while certain forms of the present invention have been illustrated and described herein, it is not to be limited to the specific forms or arrangement of parts described and shown.

What is claimed and desired to be secured by Letters Patent is as follows:

1. A control system for a boom sprayer including a center frame mounted for vertical movement on a mobile support, a pair of laterally extending opposite cantilever sprayer booms with a plurality of sprayer means spaced therealong and pivotally connected to said center frame for vertical movement of said booms with said center frame and for pivoting relative to said center frame about respective horizontal boom axes substantially parallel to a direction of travel of said mobile support, said control system comprising:

(a) reversible center frame motor means engaged between said center frame and said mobile support and operable to set a height of said center frame relative to said mobile support;

(b) a pair of boom motor means associated respectively with said booms, each boom motor means being engaged between the associated boom and said center frame and operable to cause said pivoting movement therebetween; and (c) automatic boom control means including:
  (1) energy transducer means mounted on each sprayer boom in spaced radial relation to the associated boom axis and operative to transmit an energy toward a sprayer target and receive reflections of said energy from said target;
  (2) boom end height set means operable to position each boom to a desired boom end height between an end of said boom and said target; and
  (3) boom end height control circuit means coupled to said transducer means, said boom end height set means, and the associated boom motor means; said control circuit means being operative to measure an echo time interval between transmitting and receiving said energy which is proportional to an actual boom end height, to compare said echo time interval with a set time interval proportional to said desired boom end height, and to activate the associated boom motor means in such a direction as to minimize a difference between said echo time interval and said set time interval.

2. A system as set forth in claim 1 wherein said control circuit means includes:
  (a) dead band means operative to inhibit activation of said boom motor means unless said difference between said set time interval and said echo time interval exceeds a selected time difference interval.

3. A system as set forth in claim 1 wherein:
  (a) each transducer means is a sound transducer and said energy transmitted therefrom and received thereby is sound energy.

4. A system as set forth in claim 3 wherein each transducer means includes:
  (a) a transducer element; and
  (b) a transducer housing having said transducer element mounted therein.

5. A system as set forth in claim 4 wherein said transducer housing includes:
  (a) a transducer element chamber;
  (b) a reflector chamber including reflector wall means sloping downwardly and outwardly from said sensor chamber and a mouth open downwardly below said reflector wall means;
  (c) said transducer element being mounted in said element chamber and oriented generally horizontally and toward said reflector wall means; and
  (d) said reflector wall means being oriented to reflect sound energy received horizontally from said transducer element toward a downward direction.

6. A system as set forth in claim 1 wherein said control circuit means includes:
  (a) a digital computer.

7. A system as set forth in claim 6 wherein:
  (a) said computer is programmed to emulate a closed loop feedback control system.

8. A method for controlling the height of a plurality of sprayers above sprayer targets, said sprayers being mounted in spaced relation along a pair of laterally extending cantilever sprayer booms pivotally connected to a center frame which is mounted for vertical movement on a mobile support, center frame motor means being engaged between said center frame and said mobile support, and boom motor means being engaged respectively between said booms and said center frame, said method comprising the steps of:
  (a) manually activating said boom motor means to position an end of each boom at desired heights above said targets;
  (b) automatically measuring a height of an end of each boom above said targets to derive a reference height for each boom;
  (c) thereafter, periodically measuring said height of said end of each boom above said targets to derive a current height for each boom;
  (d) automatically comparing said current height with said reference height for each boom to derive a height error for each boom; and
  (e) automatically activating said boom motor means to move each boom in such a manner as to minimize said height error for the associated boom.

9. A method as set forth in claim 8 and including the step of:
  (a) manually activating said center frame motor means to position sprayers adjacent said center frame at a selected height above said targets.

10. A method as set forth in claim 8 wherein said measuring steps include the steps of:
  (a) providing ultrasonic transducer means on said end of each boom;
  (b) transmitting ultrasonic energy from said transducer means toward said targets;
  (c) receiving ultrasonic energy reflected from said targets back to said transducer means;
  (d) measuring an echo time interval between said transmitting and receiving steps; and
  (e) proportioning said echo time interval to a height of said transducer means above said targets.

11. A method as set forth in claim 8 wherein each of said measuring steps include the steps of:
  (a) measuring each said height a plurality of times; and
  (b) averaging a selected plurality of measured heights to derive said reference height or said current height.

12. A method as set forth in claim 8 and including the steps of:
  (a) performing said comparing and activating step by means of a digital computer.

13. A method as set forth in claim 12 and including the step of:
  (a) programming said digital computer to control said boom motor means in relation to said reference height and said current height in the manner of a closed loop feedback control system.

14. A method as set forth in claim 8 and including the step of:
  (a) performing said activating step only upon said height error exceeding a selected minimum height error.

* * * * *